UNITED STATES PATENT OFFICE.

MORITZ F. JACOBS, OF NEW YORK, N. Y.

CARPET-CLEANING COMPOSITION.

SPECIFICATION forming part of Letters Patent No. 302,732, dated July 29, 1884.

Application filed June 14, 1884. (No specimens.)

*To all whom it may concern:*

Be it known that I, MORITZ F. JACOBS, of the city, county, and State of New York, have invented certain new and useful Improvements in Carpet-Cleaning Compositions, of which the following is a specification.

This invention relates to an improved composition for cleaning carpets in an effective manner from dust and other impurities without injury to the color or structure; and the invention consists of a mixture of rock-salt, sal-soda, and borax, which is prepared in the following manner and proportions: Sixty parts of rock-salt, twenty parts of sal-soda, and twelve parts of borax are finely pulverized and thoroughly mixed together. The powder thus obtained is spread over the carpet and rubbed into the same by a brush. The powder takes up the dust and other dirt, and is finally swept together again with the broom. The same quantity can be used several times until the powder assumes a dark gray or blackish color. The dust and dirt adhere to the powder, which has no injurious effect upon the color and fibers of the carpet, but cleans the same in an effective and economical manner without requiring it to be taken up.

Having thus described my invention, I claim as new and desire to secure by Letters Patent—

A carpet-cleaning composition consisting of pulverized rock-salt, sal-soda, and borax, substantially as set forth.

In testimony that I claim the foregoing as my invention I have signed my name in presence of two subscribing witnesses.

MORITZ F. JACOBS.

Witnesses:
PAUL GOEPEL,
SIDNEY MANN.